Jan. 30, 1962 T. K. AALUND ET AL 3,019,301

INTELLIGENCE STORING DEVICE FOR RECORDING EQUIPMENT

Filed Aug. 19, 1960 2 Sheets-Sheet 1

INVENTORS
THOMAS K. AALUND
HERBERT SULLIVAN
BY Darby & Darby
ATTORNEYS

Jan. 30, 1962 T. K. AALUND ET AL 3,019,301

INTELLIGENCE STORING DEVICE FOR RECORDING EQUIPMENT

Filed Aug. 19, 1960 2 Sheets-Sheet 2

INVENTORS
THOMAS K. AALUND
HERBERT SULLIVAN
BY Darby & Darby
ATTORNEYS

United States Patent Office 3,019,301
Patented Jan. 30, 1962

3,019,301

INTELLIGENCE STORING DEVICE FOR RECORDING EQUIPMENT

Thomas K. Aalund, Roslyn, and Herbert Sullivan, New York, N.Y., assignors to The Siegler Corporation, Long Island City, N.Y., a corporation of Delaware
Filed Aug. 19, 1960, Ser. No. 50,677
13 Claims. (Cl. 179—100.2)

Figure 1:
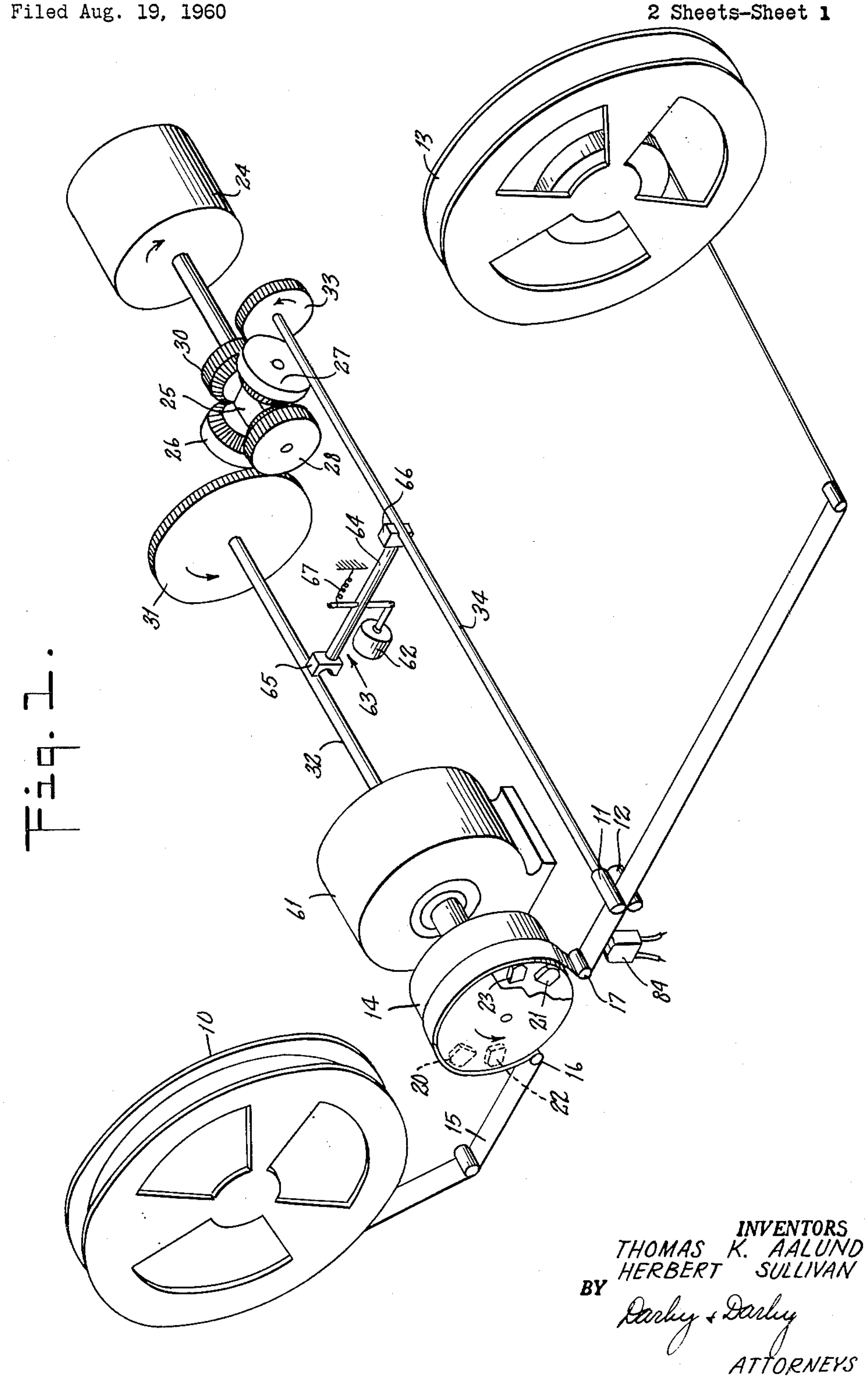

The present invention relates to the recording of intelligence on magnetic tape, wire or other sensitive media in which the medium and a recording head are moved relative to each other.

More particularly the invention, although not limited thereto, is directed to longitudinal scanning systems in which the recording head is stationary during the recording and the medium, whether it be tape, wire or otherwise, is transported past the head at a suitable velocity.

In such systems, if long periods of blank medium are to be avoided, particularly when messages are received infrequently, it is customary to start the tape in motion just prior to a recording. However, due to the fact that a certain time elapses between the initiation of transport motion and actual movement of the tape with respect to the recording head at the intended velocity, there arises the necessity of either engaging the transport mechanism prior to recording, or of losing at least a minute part of the intelligence.

There are, however, many instances where no loss of intelligence, however minute, can be tolerated. It is frequently desirable to have a recording device activated automatically by the intelligence to be recorded or by other nonmanual means. For example, it is desirable, in a dictating machine, to have tape movement initiated by the voice signal so that the tape is stationary during those periods when dictation is not taking place, thus avoiding the necessity commonly present of ultizing a manual switch to initiate operation of the machine during periods just prior to and during dictation.

If operation of the machine is to be initiated by signals derived from the intelligence to be recorded, it is clear that the "record command" or signal to initiate the transport of the tape is produced at a time subsequent to the beginning of the intelligence to be recorded.

In the past it has been customary to use a separate intelligence storing device such as a tape loop, a delay line, or other similar type device which will store intelligence for a time interval equal to or exceeding the time required for the "record command" to be produced and for the tape transport drive to be initiated and achieve its normal speed. Such separate storage devices are bulky and inconvenient and frequently require both additional recording and additional reproducing amplifiers.

By means of the present invention the use of such separate storage loops or delay lines is eliminated, together with the need for any time delay between the receipt of intelligence and the recording thereof. This provision for recording all parts of a message takes the form of means for moving the recording head relative to the tape as well as means for moving the tape relative to the head; the means being so coordinated that the relative speed between the recording head and the tape remains constant.

It is an object of our invention to provide recording equipment in which, despite the fact that no separate storage mechanism is provided, the tape transport may be intermittently operated to record individual messages, and assurance be had that all parts of each message, including the initial parts thereof, will be properly recorded.

It is another object of our invention to achieve this recording of all parts of individual messages by causing the recording head to move relative to the recording medium during standby conditions and to cause the head to become stationery and the tape to move relative thereto after the initial portion of a message has been received.

It is another object of our invention to provide means for recording individual messages as mentioned above wherein the relative movement of the tape and the recording head is always at a constant velocity, although at times the tape is stationary and the recording head rotating, and at other times the head is stationary and the tape is transported.

It is another object of the invention to provide for such constant relative velocity of the tape and recording head by means of the ordinary gear differential, thus ultizing a reliable and simple mechanism for achieving the constant relative velocity above mentioned.

It is a further object of the invention to eliminate the use of plain loops, Moebius loops, delay lines and other such means.

Figure 2:
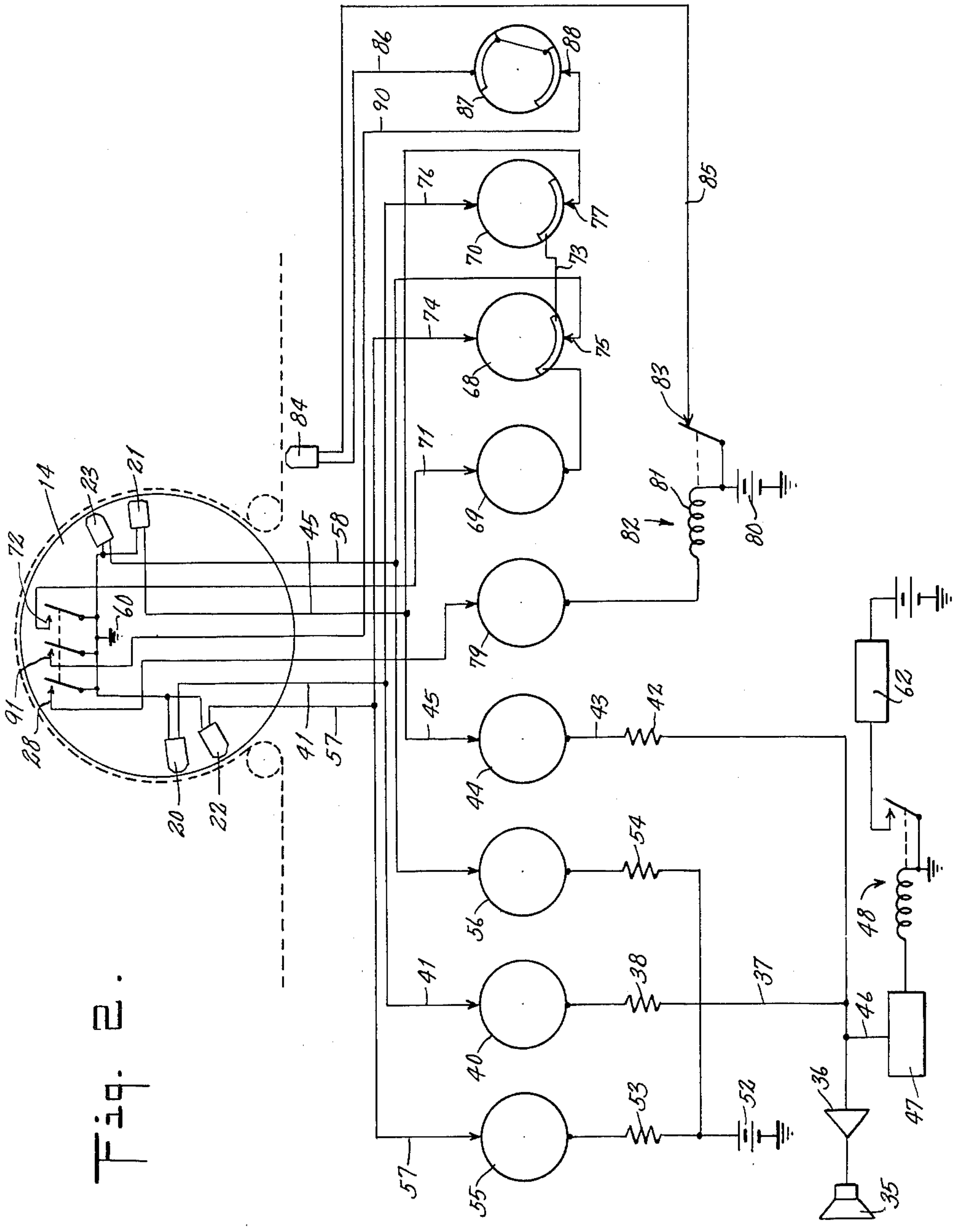

Other objects and features of the invention will become apparent when the following description is considered in connection with the annexed drawings in which, FIGURE 1 is a perspective view of the mechanical elements utilized in our invention showing particularly the mode of driving the drum carrying the recording heads and the tape transport means through a differential from a common power source; and FIGURE 2 is a schematic circuit diagram showing the circuit utilized with the recorder of FIGURE 1 and particularly the control commutators and relays to effect proper starting and stopping of the drum and proper erasing of unwanted recorded intelligence.

In the embodiment of the invention shown in the drawings, a magnetic tape is utilized and it is assumed that the mechanism is embodied in a dictating machine and that the voice signals are utilized to cause transfer of the mechanism from the standby to the operating condition. It will of course be understood that the mechanism may equally well be used to receive messages by wire or radio in which the voice signals are utilized to moduate a carrier frequency and that in these instances the transfer operation may be initiated by reception of the carrier frequency rather than by demodulation and operation by voice frequency signals.

Referring now to the drawings and particularly to FIGURE 1 thereof the tape which is to be recorded upon is fed from a supply reel 10 to a driving capstan 11 and its associated pressure roller 12 and taken up upon a take-up reel 13 which may be spring driven or driven through a slip clutch from the power source. Rotatably mounted in the tape path between the supply reel 10 and the driving capstan 11 is a drum 14 about a major portion of the periphery of which the tape 15 passes, being guided for this purpose over the idler rollers 16 and 17.

Mounted at the ends of a diameter of the drum are two recording heads 20 and 21 together with corresponding erase heads 22 and 23. It will be seen that as the tape 15 travels about the periphery of drum 14 any signals supplied to the recording heads 20 and 21 will be recorded upon the tape and will be erased therefrom by the following erase head at a time equivalent to that required for slightly less than 180° of rotation of the drum.

The drum 14 and capstan 11 are driven through a gear differential from a common power source 24. This differential comprises the usual spider 25 with gears 26 and 27 mounted thereon and driving gears 28 and 30.

As shown, gear 28 drives gear 31 and, through shaft 32, the drum 14. In a similar manner gear 30 drives a gear 33 and, through a shaft 34, the capstan 11. The diameter of drum 30 and capstan 11, together with the gear ratio between the differential and these devices is such that the lineal speed of the tape about the drum, is identical with the lineal speed of the heads relative to the tape when the tape is stopped. Thus the recording heads and erasing heads are constantly moving with respect to the tape 15 at a constant velocity although at times the tape may be stopped and at other times the drum may be stopped.

Means are provided for braking the drum or the capstan. When the drum is stationary the tape moves in its path about the periphery of that drum whereas when the capstan shaft 34 is braked the tape is stationary and the capstan rotates relative thereto. Moreover during the deceleration of the drum or capstan the capstan or drum respectively is accelerated at a corresponding rate so that the speed of the drum relative to the capstan is a constant at all times.

The condition in which the capstan shaft 34 is braked is the standby condition and during this condition the tape remains stationary as indicated hereinabove and the drum and recording heads rotate in the direction of the arrow with respect to the loop extending about a major portion of the drum periphery.

Referring now to FIGURE 2, there is shown therein at 35 a microphone which may be the microphone of a magnetic tape recorder of the type frequently utilized for recording dictation. Electrical signals generated in the microphone 35 are fed to the amplifier 36 and thence by way of conductor 37, resistor 38, slip ring 40 and conductor 41 to recording head 20. This signal is also fed through resistor 42, conductor 43, slip ring 44 and conductor 45 to the second recording head 21. At the same time the amplified signals are fed over conductor 46 to a detector 47 and the output of that detector is applied to the winding of a relay 48.

The erase heads are energized over circuits including the battery 52, and extending from this battery through resistors 53 and 54, slip rings 55 and 56 and conductors 57 and 58 to the erase heads 22 and 23 respectively, the erase heads being grounded at 60 through the driven shaft or in other suitable manners.

The various slip rings are fixed about the shaft 32 and brushes on the erase and recording heads make contact therewith. The slip rings are not shown in detail in FIGURE 1 but are included within the control unit designated as 61 in that figure.

Returning now to FIGURE 2 it will be seen that voice signals are converted to electrical signals of audio frequency and applied to the recording heads and that concurrently the erase heads are energized. Consequently when in the standby condition as above described, the recording heads 20 and 21 will record material on the tape 15 which material will be erased by the following erase head 23 or 22 respectively.

A brake solenoid 62 is connected to the contacts of relay 48, this solenoid operating upon a brake mechanism indicated at 63 in FIGURE 1 and comprising the rod 64 and the brake shoes 65 and 66 arranged to engage the shafts 32 and 34 respectively. Spring 67 normally holds brake shoe 66 in engagement with shaft 34 and therefore restrains capstan 11 from rotation while permitting drum 14 to rotate.

Shortly after the initial voice signal arrives at microphone 35 the detector 47 supplies a demodulated signal to the winding of relay 48 and that relay operates. As a result of that operation the brake solenoid 62 is energized and after the necessary interval for slowing down the drum 14 comes to rest. As has been indicated, each of the recording heads will have recorded the initial portion of the message or dictation during the interval required to energize the relay 48 and solenoid 62 and to bring the drum to a stop. As the drum comes to the stop position the shaft 34 attains its full speed and the tape therefore is moved past the recording heads to record the remainder of the message.

It will be apparent that a times one or the other of the recording heads 20 and 21 will lie in the gap of the tape loop. Whenever a recording head is rotating through that gap at the time when the initial portion of the message is produced, a part of the initial portion will not be recorded by that head and it is therefore necessary to provide a means for assuring that that head be rendered non-recording subsequent to the stopping of the drum, since otherwise a partially recorded message would occur rather than a complete one.

It is also necessary that at this time the erase magnet associated with the head which recorded the partial message be deenergized so that the full message recorded by the other recording head will not be erased.

It is of course possible that one of the recording heads will stop in the gap. This, however, is unimportant since the other recording head will in this instance have recorded a complete message, and the associated erase head will remain energized and will remove the partial recording of the head first mentioned.

Referring now to FIGURE 2, let it be assumed that head 21 lies in the tape gap (which gap is 45° of arc) at the time when the initial portion of the message is received, and let it also be assumed that the total time for energizing relay 48 and thereafter brake solenoid 62 and bringing the drum to a stop is equal to the time for the drum to rotate through the gap area plus the time required for that drum to rotate through substantially 45°. It will be seen that since the total time from the initiation of a message to the stopping of the drum is a maximum of 90°, then if means are provided to deenergize recording head 21 and its associated erase head 23, when that head stops in a period less than 90° of rotation from the beginning of the gap the partial message thereon will not be completed. The other head 20, however, will have thereon the entire message, the initial part being recorded while the drum is rotating and the remainder recorded while the drum is stationary and the tape being transported.

In order to deenergize the recording head and the erase head which were in the gap when the initial portion of the message was received, commutators 68 and 70 are provided. Commutator 68 is connected by means of slip ring 69 and conductor 71 to centrifugal switch 72 (mounted in drum 14) and, when that switch is closed, to ground. Commutator 70 is connected by means of conductor 73 to commutator 68 so that it also is grounded when the drum stops and switch 72 operates. In place of a centrifugal switch a time delay relay may be utilized having contacts which close a predetermined time after relay 48 operates, the time interval being equal to the stopping time of the drum.

Commutators 68 and 70 and slip ring 69 are included in the control unit 61. Brushes 74 and 75 connected to recording heads 20 and 21 respectively serve to short out those recording heads whenever the drum stops (and switch 72 closes) with the corresponding brush on the active segment of the commutator. Similarly, brushes 76 and 77 bear on commutator 70 and are connected to erase heads 22 and 23 respectively.

From the above it will be seen that, as stated, whenever the drum comes to rest with brushes 75 and 77 on the active segment of commutators 68 and 70 recording head 21 and its associated erase head 23 are shunted out and rendered ineffective and thereafter the remaining message is placed upon the tape by virtue of transport of tape past the now stationary recording head 20 which recorded the entire initial portion of the message at the time when recording head 21 recorded a part of that initial portion.

The partial initial message portion recorded on the tape by the recording head 21 will be followed by a maximum gap in recording equal to the tape length subtended by a 180° angle of the drum and this will be followed by the complete message recorded by head 20. For some usages the fact that the partial initial portion of the message is repeated in unimportant whereas for other usages such as in a dictating machine it would be inconvenient and probably result in transcription errors.

In order to obviate this, centrifugal switch 72 is provided with an additional set of contacts designated 78, these contacts being in series with a brush bearing on a slip ring 79 (also included in control unit 62). Connected to slip ring 79 is the winding 81 of a slow-to-operate relay 82 the other side of the winding of which is connected to grounded battery 80. Contacts 83 of relay 82 are connected to battery 80 and by conductor 85 to an auxiliary erase head 84. This erase head is connected by a conductor 86 to a stationary commutator 87 (also a part of the control unit) and through brush 88 and conductor 90 to a third set of contacts 91 of switch 72.

Therefore each time that the drum stops with either recording head within a 45° arc counterclockwise of the tape gap, erase head 84 is energized, the energization continuing for a period determined by the operating time of relay 81, it being clear that when relay 81 operates the circuit extending from the battery over contacts 83, conductor 85 through erase head 84, conductor 86, segment of commutator 87, brush 88, conductor 90, conductor 71, contacts 91 of the centrifugal switch to ground is broken at contacts 83.

The operating time of relay 82 is made equal to the time required for the recording head 20 or 21 as the case may be to move from the counterclockwise end of the tape gap to the end of the active segment of commutators 68 and 70 (40°) plus a time equal to the arc traversed by the drum from the time when the brake is applied to the drum until the drum becomes completely stopped. We have assumed that this time is equal to 20° of arc; this time has to be added because during this stopping time the capstan 11 will be accelerating and it will move a tape length equal to 20° of drum arc past a stationary point during this period. Additionally, the erase magnet 84 must be situated at a distance corresponding to this 20° arc along the tape from the idler roller 17.

The auxiliary erase magnet 84 thus serves to erase any partial initial message portion recorded on the tape and there thus remains on the tape only the complete initial portion followed by the remaining portion recorded while the drum was stationary and the tape moving relative thereto. There will therefore be no "stuttering" when the message is played back.

Whenever the drum stops in a position such that neither of the recording heads 20 and 21 lies in the gap or within a distance of 45° counterclockwise of the counterclockwise end of the gap, both recording heads will record a complete message including a complete initial portion. In this instance both erase magnets will remain active and therefore only that recording head which is closest to the active segment of commutator 70 will be effective. Moreover, the auxiliary erase magnet 84 will not operate under the condition just descriebd since one of its active commutator segments is coextensive with the active commutator segments of commutators 68 and 70 and the other thereof is displaced 180° from the first and is of the same length.

The only other condition to be considered is that which arises when one of the recording heads stops just within the tape gap so that that commutator head will have properly recorded the beginning of the initial portion of the message, but will not have recorded the terminating part of the initial portion. In this event, due to the fact that the commutator segments of commutators 68 and 70 extend to the counterclockwise end of the tape gap, that particular recording head and its associated erase magnet will be deenergized although without effect since in this case the other recording head will have recorded a complete message and that message will be the one used in any event.

The relay 48 is a slow-to-release relay and is timed to permit the tape transport to continue until the last portion recorded upon has been fed past the auxiliary erase magnet 84.

Although a preferred embodiment of our invention has been described, it will be understood that modifications may readily be made including the use of tape which is transversely recorded rather than longitudinally recorded. It will also be clear that although the device has been described as applied to a dictating machine, there are many other applications of the invention. For example, a radio receiver might be the source of input signals to the amplifier 36 rather than the microphone 35 and the detector 47 rather than being a detector of audio frequency signals might detect the presence of radio frequency signals.

In any case the control circuits may be biased to operate only when signals above a certain level are received, to assure that noise does not initiate operation of the tape transport.

The angles mentioned in connection with the tape gap, the stopping time of the drum, etc., are understood to be purely illustrative, it being only necessary that the time intervals represented by these angles are so correlated that no partially recorded message is retained while no message otherwise complete is interfered with due to improper timing.

In view of the many possible modifications, only a few of which have been suggested, we wish to be limited not by the foregoing description, but on the contrary solely by the claims granted to us.

What is claimed is:

1. A recorder adapted to record intelligence fed thereto at random times without wastage of recording medium comprising, in combination, recording heads adjacent said recording medium, said heads being mounted in a rotatable drum, means guiding the recording medium about a major portion of the circumference of said drum, means for transporting the recording medium through said circumferential path at a predetermined linear speed, means for rotating said drum at a circumferential linear speed equal to said predetermined speed and means for stopping one of said transporting means and said drum rotating means and starting the other thereof while maintaining the relative linear speed of said recording medium and said recording heads at a constant value.

2. A recorder adapted to record intelligence fed thereto at random times without wastage of recording medium comprising, in combination, supply and takeup reels for recording medium, recording heads adjacent said recording medium, said heads being mounted in a rotatable drum, means guiding the recording medium about a major portion of the circumference of said drum, means for transporting the recording medium through said circumferential path at a predetermined linear speed, means for rotating said drum at a circumferential linear speed equal to said predetermined speed and means for stopping one of said transporting means and said drum rotating means and starting the other thereof while maintaining the relative linear speed of said recording medium and said recording heads at a constant value.

3. A recorder in accordance with claim 1 wherein said means for maintaining the relative linear speed at a constant value comprises a gear differential having two outputs, one connected to said drum and the other to said recording medium transporting means.

4. A device in accordance with claim 3 wherein said stopping means comprises a brake operable upon said differential outputs alternatively.

5. A recorder in accordance with claim 4 wherein said brake is normally applied to said output coupled to said recording medium transporting means.

6. A recorder adapted to record intelligence fed thereto at random times without wastage of recording medium comprising, in combination, supply and takeup reels for recording medium, recording medium transport means located between said supply and takeup reels, a drum rotatably mounted between said supply reel and said transporting means, means guiding said tape about a major portion of the periphery of said drum, a plurality of recording heads mounted in said drum for recording upon said circumferential recording medium portion, means applying signals corresponding to intelligence to be recorded to said recording heads, means driving said recording medium transport means to move said medium through said circumferential path at a predetermined linear speed, means for rotating said drum and said recording heads at a circumferential linear speed equal to said predetermined speed, means normally retaining said transport means stationary, means actuated by receipt of intelligence to release said transport means and stop said drum, and means to maintain the linear speed of said recording heads relative to said recording medium constant during the transition from solely drum movement to solely medium movement.

7. A recording device in accordance with claim 6 wherein a plurality of recording heads is provided, and wherein means are provided operable upon stopping of said drum to deenergize a recording head which received signals while rotating through a portion of the circular path having no recording medium adjacent thereto, said deenergization preventing recording of the remaining signals of a complete intelligence unit by said deenergized head.

8. A recording device in accordance with claim 6 wherein a plurality of recording heads and a like plurality of erasing heads is provided and wherein a means is provided operable upon stopping of said drum to deenergize a recording head which received signals while rotating through a portion of its circular path having no recording medium adjacent thereto and simultaneously to deenergize the corresponding erase head, deenergization of said recording head preventing recording of the remaining portion of an intelligence unit by said deenergized head and deenergization of said corresponding erase head preventing erasure of the completely recorded intelligence unit recorded by another recording head.

9. A recording device in accordance with claim 8 wherein two recording heads are provided spaced at the ends of the diameter of said drum and wherein two erase heads are provided, each associated with one of said recording heads and placed adjacent to that recording head in the direction of drum rotation.

10. A device in accordance with claim 8 wherein an auxiliary erase magnet is provided, said auxiliary magnet being located between said record medium transport means and the end of said circumferential path adjacent said transport means, and means are provided for energizing said auxiliary erase magnet to erase signals recorded on said tape by said one head prior to its deenergization.

11. A device in accordance with claim 10 wherein means are provided for deenergizing said auxiliary erase magnet after a predetermined time less than that required for the completely recorded intelligence unit to reach said auxiliary erase magnet.

12. A device according to claim 8 wherein said stopping means comprises a relay operated by energy derived from intelligence signals and a solenoid energized upon operation of said relay to apply a brake to said drum and remove a brake from said record medium transporting means.

13. A device in accordance with claim 12 wherein said relay is slow to release and is set to permit the terminating signals of an intelligence unit to pass said auxiliary magnet before said solenoid is deenergized and said brake applied to said record medium transporting means and removed from said drum.

References Cited in the file of this patent

UNITED STATES PATENTS

| | | |
|---|---|---|
| 2,656,419 | Dingley | Oct. 20, 1953 |
| 2,903,521 | Ellison | Sept. 8, 1959 |